United States Patent [19]
Takahashi

[11] Patent Number: 5,878,807
[45] Date of Patent: Mar. 9, 1999

[54] FLUID CHANNELING UNIT

[76] Inventor: Kei Takahashi, 1-14-16 Achi, Kurashiki, Okayama 710, Japan

[21] Appl. No.: 799,789

[22] Filed: Feb. 12, 1997

[30] Foreign Application Priority Data

Feb. 16, 1996 [JP] Japan .................................. 8-053855

[51] Int. Cl.⁶ ...................................................... F24J 2/36
[52] U.S. Cl. ........................... 165/46; 126/624; 126/626; 126/546; 165/170
[58] Field of Search ...................... 165/46, 170; 126/570, 126/624, 626, 564; 138/113, 115, 116

[56] References Cited

U.S. PATENT DOCUMENTS

| | | | |
|---|---|---|---|
| 2,457,449 | 1/1948 | Granja | 126/626 |
| 3,411,156 | 11/1968 | Feher | 165/46 X |
| 4,004,380 | 1/1977 | Kwake | 52/2 |
| 4,160,523 | 7/1979 | Stevens | 237/1 A |
| 4,313,422 | 2/1982 | McEntee | 126/624 |
| 5,205,348 | 4/1993 | Tousignant et al. | 165/46 |
| 5,324,320 | 6/1994 | Augustine et al. | 607/107 |

FOREIGN PATENT DOCUMENTS

| | | |
|---|---|---|
| 63-297966 | 12/1988 | Japan . |
| 1147257 | 6/1989 | Japan . |
| 255056 | 4/1990 | Japan . |
| 2100168 | 8/1990 | Japan . |
| 2106551 | 8/1990 | Japan . |
| 414967 | 2/1992 | Japan . |
| 453157 | 5/1992 | Japan . |
| 457161 | 5/1992 | Japan . |
| 463745 | 5/1992 | Japan . |
| 4165266 | 6/1992 | Japan . |
| 4306459 | 10/1992 | Japan . |
| 510952 | 2/1993 | Japan . |
| 526517 | 2/1993 | Japan . |
| 594656 | 12/1993 | Japan . |
| 594657 | 12/1993 | Japan . |
| 6185811 | 7/1994 | Japan . |
| 651751 | 7/1994 | Japan . |
| 656657 | 8/1994 | Japan . |
| 659762 | 8/1994 | Japan . |
| 664066 | 9/1994 | Japan . |
| 664067 | 9/1994 | Japan . |
| 6339259 | 12/1994 | Japan . |
| 78996 | 3/1995 | Japan . |
| 735956 | 7/1995 | Japan . |
| 741267 | 7/1995 | Japan . |
| 741283 | 7/1995 | Japan . |
| 742915 | 8/1995 | Japan . |
| 742918 | 8/1995 | Japan . |
| 748040 | 11/1995 | Japan . |
| 861784 | 3/1996 | Japan . |
| 8184216 | 7/1996 | Japan . |
| 8261569 | 10/1996 | Japan . |

*Primary Examiner*—Allen Flanigan
*Attorney, Agent, or Firm*—Carrier, Blackman & Associates, P.C.; Joseph P. Carrier; William D. Blackman

[57] ABSTRACT

A flow controllable unit includes a pair of spaced upper and lower sheets. A plurality of elongated partitions are sandwiched between the upper and lower sheets to define a plurality of fluid passages. The partitions have an intermediate region and opposite lateral sides. The partitions are secured to the upper and lower sheets so that the intermediate region is movable relative to the upper and lower sheets. When a pressure increase occurs within the passages, the intermediate region of the partitions is bent or deformed to allow the upper and lower sheets to be moved away from each other. This movement increases the effective cross sectional area of the passages to accommodate such a pressure increase. The partitions thus provide a pressure relief function.

17 Claims, 9 Drawing Sheets

FLUID CHANNELING UNIT

BACKGROUND OF THE INVENTION

1. Field of the Invention

The present invention relates to flow controllable units adapted to permit the flow of a fluid in a controlled manner. More particularly, this invention is directed to a flow controllable panel which directs a flowing fluid medium through a plurality of passages and which is capable of adjusting the flow rate of the flowing fluid medium. Such a flow controllable panel may be used as a heat exchanger, an evaporator or similar apparatus.

2. Description of the Related Art

Various attempts have been made to cause a fluid to flow over a flat sheet or through a panel. For example, Japanese laid-open patent publication No. 8-61784 discloses a flow controllable panel (see FIG. 12) which generally includes a flat substrate, an intermediate, hydrophilic layer attached to the substrate, and a plurality of partitions attached to the intermediate layer and arranged in parallel. By this arrangement, a plurality of fluid passages are defined in the intermediate layer between adjacent partitions. The partitions, typically made of resin, are attached to the intermediate layer by application of pressure and heat. However, such resin is likely to enter the fluid passages while the pressure is being applied to the partition. This results in a decrease in the cross sectional area of the passages and thus, impedes or limits the flow of a fluid through the passages.

Figure 13:
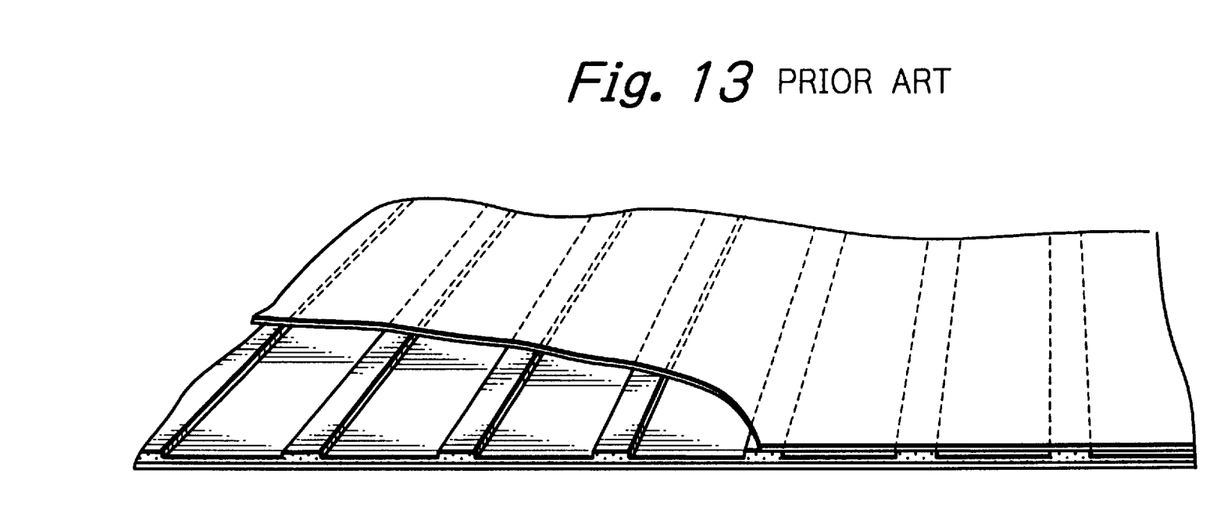
FIG. 13 is a perspective view of another conventional flow controllable panel.
Figure 14:
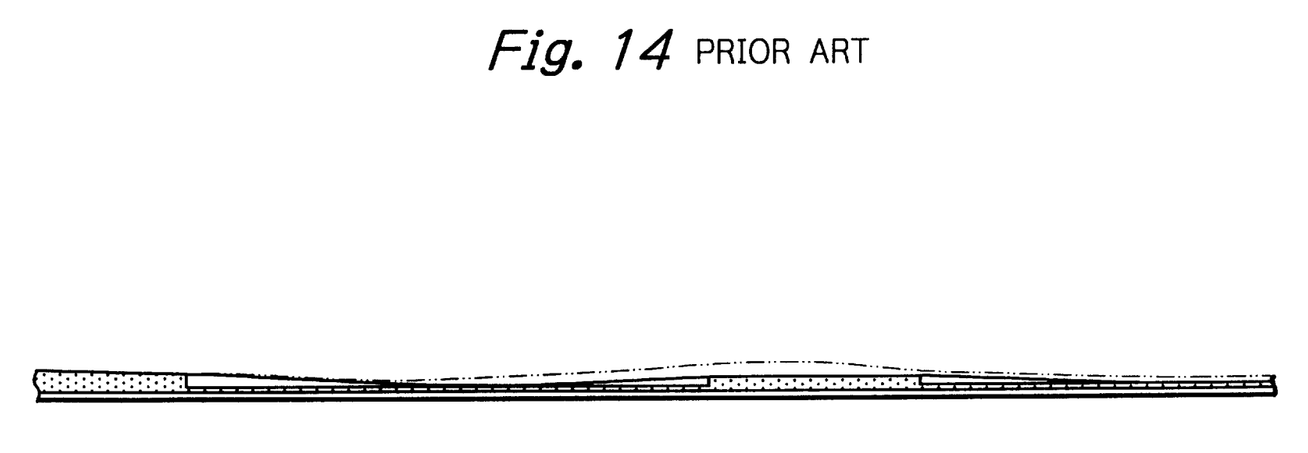
FIG. 14 is a sectional side view of the flow controllable panel shown in FIG. 13.

Japanese utility model publication No. 7-8996 discloses an improved flow controllable panel (see FIGS. 13 and 14) designed to allow a relatively large amount of fluid to flow through passages in a controlled manner. To that end, a cover sheet is secured to the free ends of partitions and expandable so as to prevent the internal pressure of the passages from increasing. However, after repeated use, the cover sheet often becomes elongated as a result of thermal expansion. Such elongation also occurs where a vacuum is created in the bottom of the passages as a result of a reduced flow rate. Slackening of the cover sheet results, as seen in FIG. 14. Another problem is that the cover sheet tends to be attached to the substrate under the influence of a fluid remaining in the passages. Consequently, the passages partly close. In the case that the panel is used as a heat exchanger, slackening of the cover sheet and closing of the passages deteriorate the heat exchange or heat transfer capability of the panel. The panel is also susceptible to vertical loads which can also cause changes in the cross sectional area of the passages. Such changes prevent the flow rate of a fluid from being adequately controlled.

Accordingly, it is an object of the present invention to provide a flow controllable unit wherein the effective cross sectional area of passages can be varied in response to a change in the flow rate of a fluid flowing through the passages to thereby accommodate changes in the internal pressure of the passages.

It is another object of the present invention to provide a flow controllable unit which includes permeable partitions or pressure relief means to provide a fluid communication between adjacent passages.

SUMMARY OF THE INVENTION

In order to achieve the foregoing objects, the present invention provides a flow controllable unit for enabling control of the flow of a flowing fluid medium which comprises a pair of facing first and second surface elements, a plurality of elongated partitions placed between the first and second surface elements and arranged substantially in parallel, so as to define a plurality of passages between adjacent partitions. The partitions have an intermediate region extending there along, and two lateral sides located at opposite sides of the intermediate region. The lateral sides of the partitions are secured to the first and second surface elements so that the intermediate region is movable relative to the first and second surface elements so as to vary the cross sectional area of the passages in response to a change in pressure within the passages.

Preferably, one of the lateral sides has a first face and a second face opposite to the first face. The first face is secured to the first surface element whereas the second face is free to move to and from the second surface element. The other lateral side has a third face and a fourth face opposite to the third face. The third face is free to move to and away from the first surface element whereas the fourth face is secured to the second surface element.

The flow controllable unit may be arranged in a horizontal, vertical or inclined orientation.

The partitions serve as spacers to provide a sufficient space between the surface elements. The partitions also provide a mechanical connection between the facing surface elements.

When a pressure increase occurs within the passages, the facing surface elements are caused to move away from each other whereby the cross sectional area of the passages is increased to accommodate such a pressure increase. This prevents significant expansion of the surface elements. As the pressure of the fluid within the passages is reduced, the surface elements are moved toward each other and returned to their initial position.

The cross sectional area of the passages is varied in response to a change in the internal pressure of the passages. At this time, the partitions are mechanically deformed or deflected to thereby avoid application of an undue degree of force onto the surface elements. Thus, the flow controllable unit provides a high resistance to pressure and enjoys a long service life.

Preferably, the partitions are permeable so that the passages are communicated with each other. The partitions thus provide a pressure-relief function.

Advantageously, a plurality of surface elements can be readily arranged in a vertical stack.

BRIEF DESCRIPTION OF THE DRAWINGS

The present invention will now be described by way of example with reference to the accompanying drawings, in which.

DESCRIPTION OF THE PREFERRED EMBODIMENTS

Figure 1:
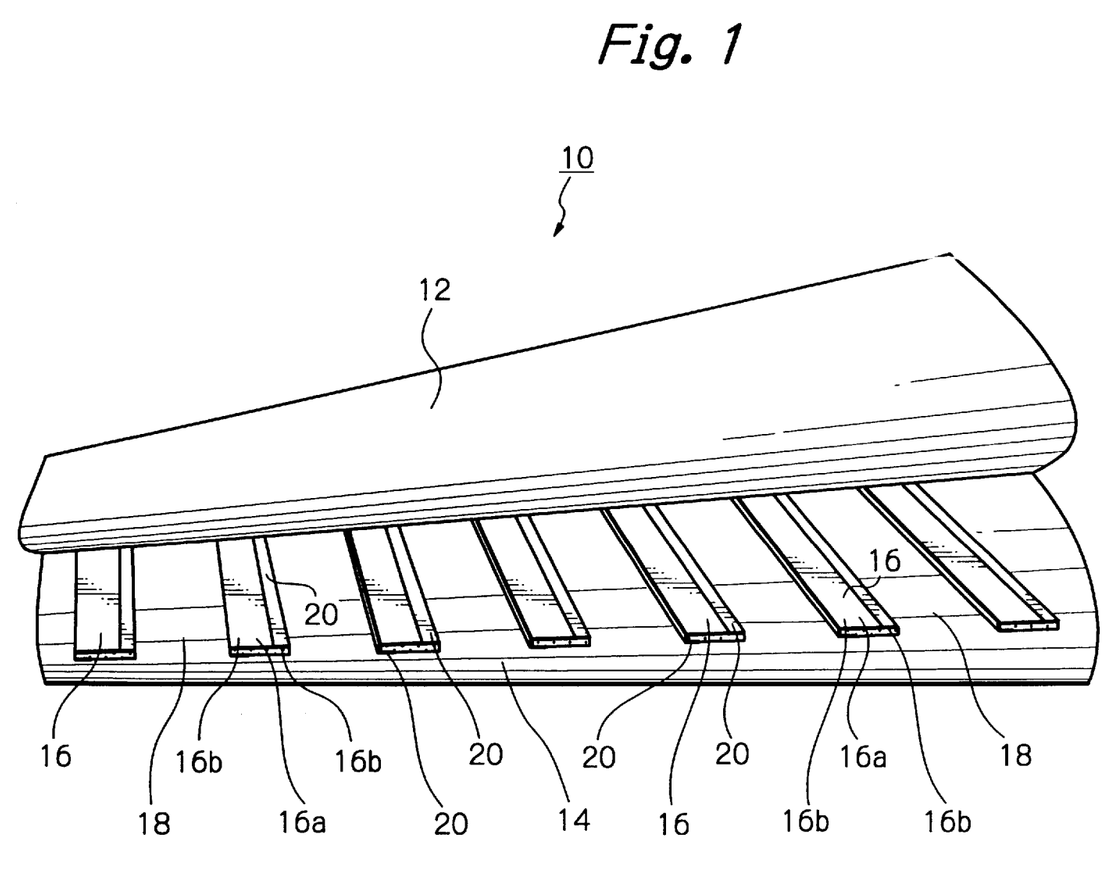
FIG. 1 is an exploded perspective view, in part, of a flow controllable panel according to one embodiment of the present invention.

Referring now to FIG. 1, there is shown a flow controllable unit 10 made according to one embodiment of the present invention. The flow controllable unit 10 is in the form of a flat panel and generally includes a pair of upper and lower sheets 12 and 14, and a plurality of elongated spacers or partitions 16 placed between the upper and lower sheets 12 and 14 and adapted to provide a connection therebetween. The spacers 16 extend along the length of the panel 10 and are arranged at equal intervals to define a plurality of parallel passages 18 through which a flowing fluid medium such as water flows. As better shown in FIG. 2, the passages 18 have a substantially identical cross sectional area.

The spacers 16 are in the form of generally rectangular plates and have a sufficient thickness to maintain the upper and lower sheets 12 and 14 in a spaced relationship. In the illustrated embodiment, the spacers 16 are secured to the upper and lower sheets 12 and 14 so that the cross sectional area of the passages 18 may be changed in response to a pressure change within the passages 18. The spacers 16 additionally serve as pressure-relief or flow control means. Each of the spacers 16 has an intermediate region 16a extending along the length of the spacer, and opposite lateral sides 16b located at opposite sides of the intermediate region 16a. The upper face of one of the lateral sides 16b is secured to the upper sheet 12, whereas its lower face is free to move to and away from the lower sheet 14. The upper face of the other lateral side 16b is free to move to and away from the upper sheet 12, whereas its lower face is secured to the lower sheet 14. To this end, a pair of elongated heat seal tapes 20 are placed between the diagonal faces of the lateral sides 16b of the spacer 16 and the upper and lower sheets 12 and 14. The spacer 16 is then joined to the upper and lower sheets 12 and 14 by application of heat and pressure. Alternatively, they may be joined by a stitching process, that is, under local application of high/low-frequency-heated electrodes. In such a case, induction heating layers (not shown) may be sandwiched between the spacer 16 and the sheets 12 and 14. To promote local induction heating, metallic filaments (not shown) may be added to such induction heating layers. The heat seal tapes 20 are attached to the spacers 16 prior to fabrication. Alternatively, the heat seal tapes 20 may be inserted between the spacers 16 and the sheets 12 and 14 during fabrication.

Figure 3:
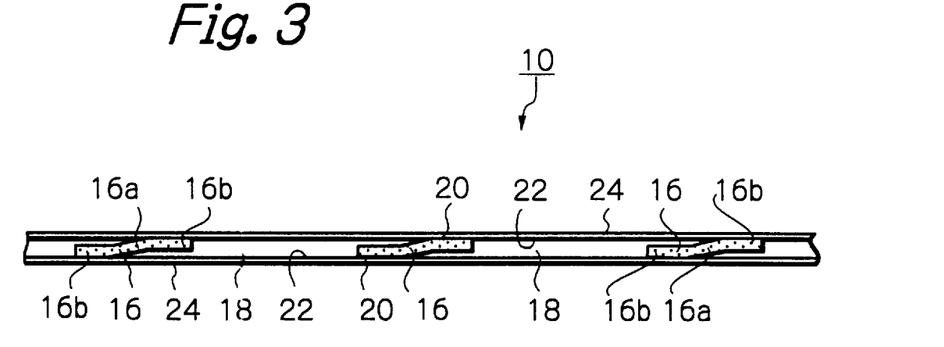
FIG. 3 is a view similar to FIG. 2, but showing the manner in which a plurality of spacers are deformed so as to vary the cross sectional area of passages to accommodate a change in the internal pressure of the passages.

Referring to FIG. 3, when a pressure rise occurs within the passages 18, the free, intermediate region 16a of each of the spacers 16 is free to move relative to the upper and lower sheets 12 and 14 while parts of the lateral sides 16b of the spacer 16 are fixedly secured to the upper and lower sheets 12 and 14 as described earlier. This of the intermediate region 16a increases the effective cross sectional area of the passages 18 so as to accommodate such a pressure rise within the passages 18. Thus, no local expansion of the sheets 12 and 14 results.

Figure 4:
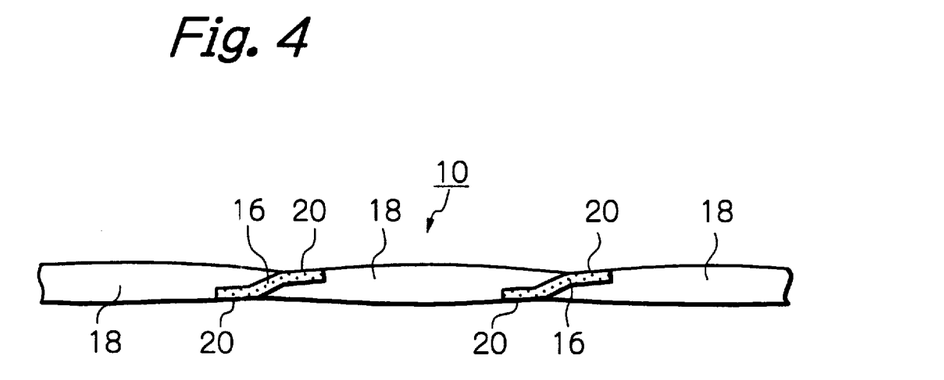
FIG. 4 is a view similar to FIG. 3, but showing the manner in which the spacers are further deformed as a result of a substantial increase in the internal pressure of the passages.

Referring to FIG. 4, when an excessive pressure increase occurs within the passages 18, more specifically, when a vertical force is exerted on the sheets 12 and 14 to thereby cause partial closure of the passages 18, then the spacers 16 are deformed to a greater extent so as to allow the upper and lower sheets 12 and 14 to be vertically moved away from each other. This prevents the sheets 12 and 14 from being subjected to undue stress and insures securement of the sheets to the spacers 16. Illustratively, the cross sectional area of the passages 18 shown in FIG. 4 is approximately four times greater than the initial cross sectional area of the passages shown in FIG. 2.

Figure 2:
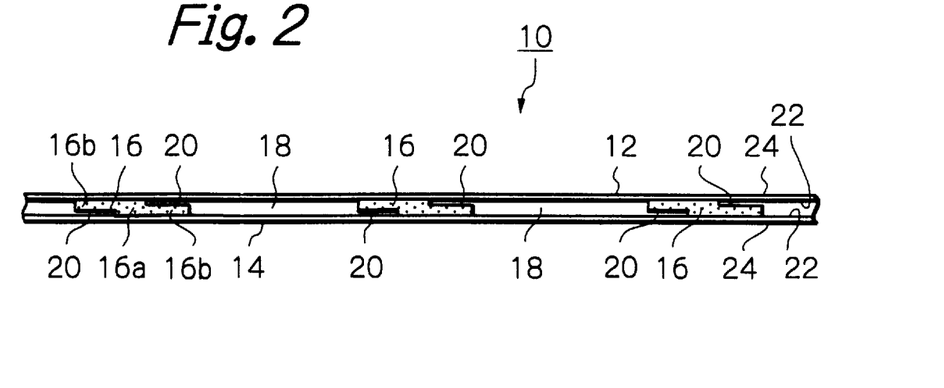
FIG. 2 is a sectional side view of the flow controllable panel shown in FIG. 1.

As shown better in FIG. 2, the upper and lower sheets 12 and 14 are each composed of a hydrophilic inner layer 22, and an outer layer 24 made of resin and laminated to the inner layer 22. A plurality of hydrophilic inner layers may be employed to facilitate attachment of the inner layers to the outer layer 24. The hydrophilic inner layers 22 may be made from woven or unwoven fabric. Preferably, the inner side of the inner layers 22 may have a relatively low density, whereas their outer side may have a relatively high density. This arrangement promotes laminate coating.

The spacers 16 are preferably permeable to liquid. Where the spacers 16 are made from a low density unwoven fabric, and the inner layers of the sheets 12 and 14 are made from a high density unwoven fabric, the heat seal tapes 20 may be preferably made of nylon.

Figure 5:
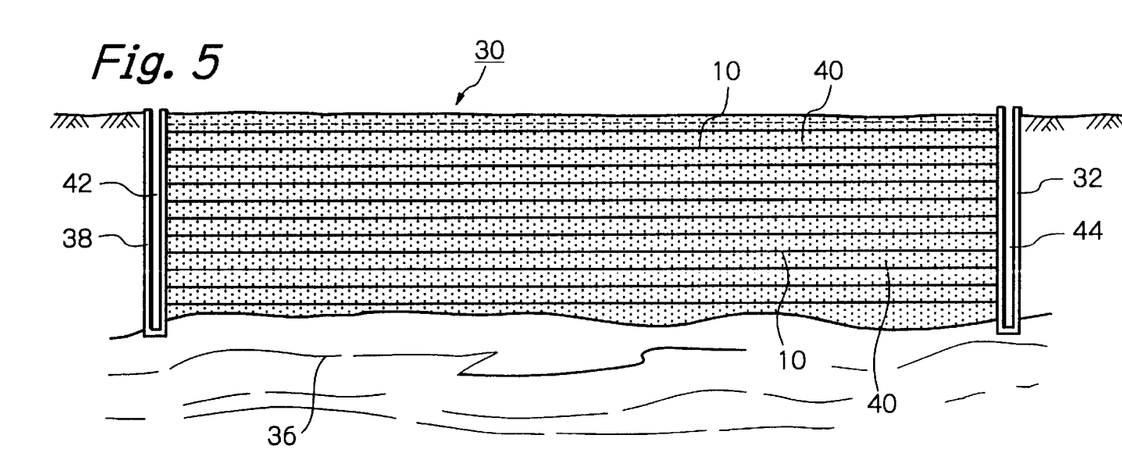
FIG. 5 is a longitudinal sectional view taken on the line V—V in FIG. 7, showing an underground heat collector to which the present invention is applied.
Figure 6:
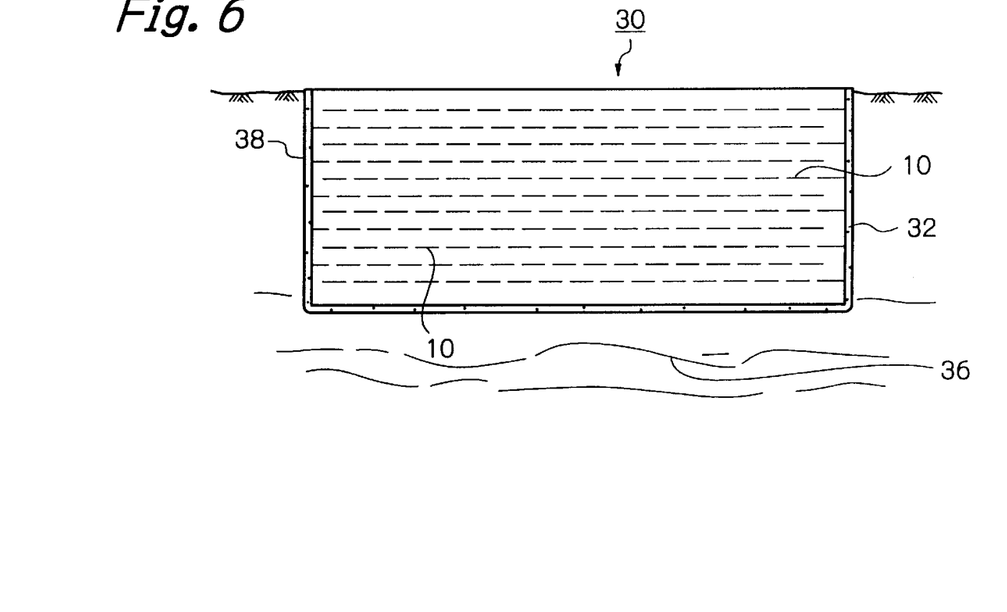
FIG. 6 is a transverse sectional view taken on the line VI—VI in FIG. 7.
Figure 7:
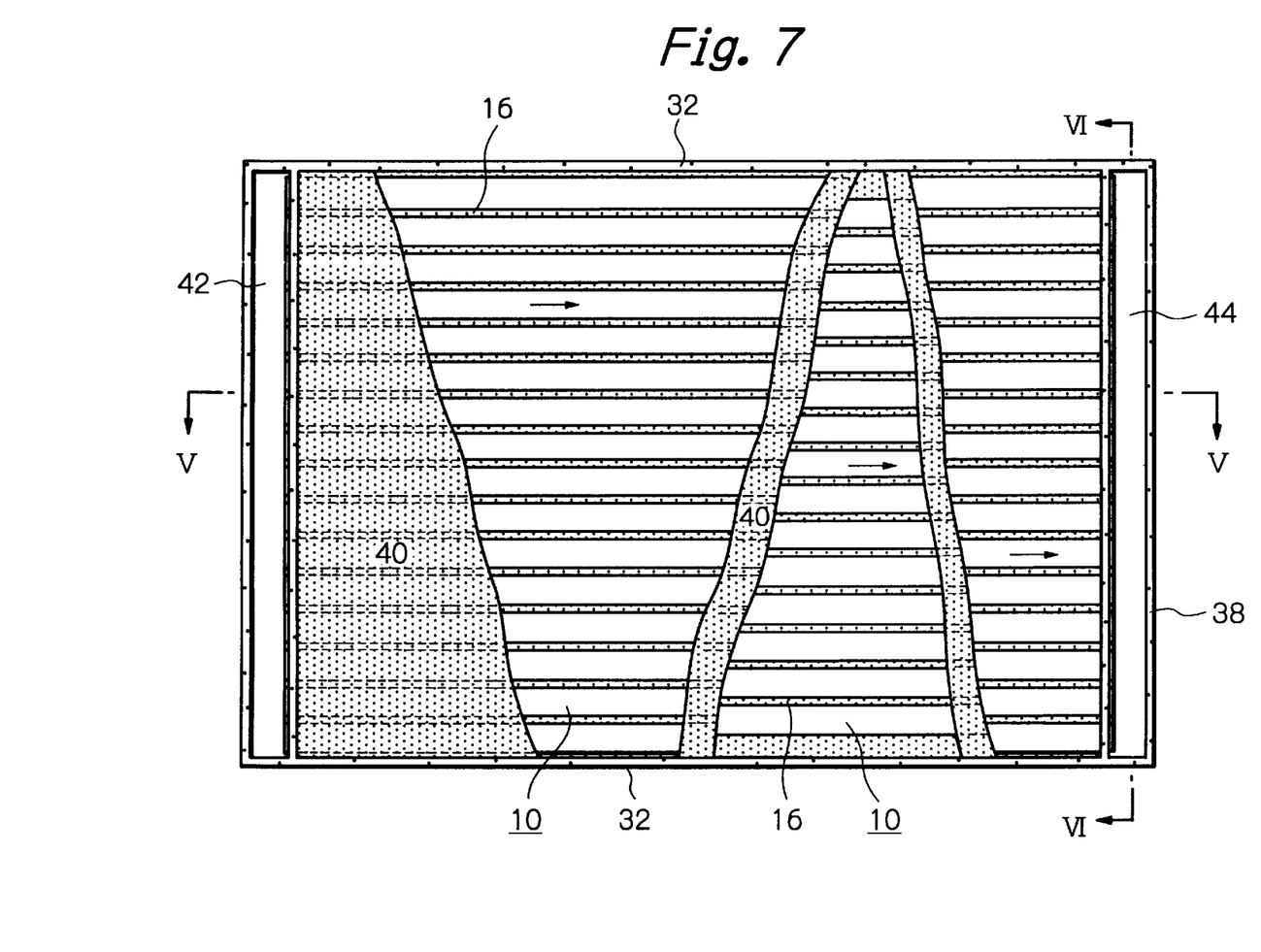
FIG. 7 is a plan view of the underground heat collector with part broken away to show its internal structure.

Turning to FIGS. 5 to 7, there is shown an underground heat collector to which the present invention is applied. Specifically, an underground heat collector 30 includes a continuous side wall 32 made of concrete and built on an impermeable stratum 36. The sand within the side wall 32 is excavated to form a heat collector shell 38. A heat collecting element 40 is arranged in the bottom of the shell 38 by the use, for example, of a press roller. The sand as excavated is separated into particles of various diameters by sieving. Advantageously, the heat collecting element 40 is made from the particles of given diameters. The flow controllable panel 10 shown in FIG. 1 is then placed on the heat collecting element 40. Subsequently, the heat collecting elements 40 and the flow controllable panels 10 are alternately arranged in a vertical stack. During this process, an appropriate amount of water is repeatedly introduced into the shell 38 to dampen the heat collecting elements 40.

A pair of reservoirs 42 and 44 are formed in opposite longitudinal ends of the shell 38 and communicated with each other through the flow controllable panels 10. Although not specifically shown in the drawing, the level of the reservoir 42 is higher than that of the reservoir 44. With this arrangement, a heat exchange medium such as water within the reservoir 42 flows toward the reservoir 44 in the direction of the arrows in FIG. 7. At this time, heat exchange takes place between the heat exchange medium and the heat collecting elements 40. It is to be understood that the weight of the heat collecting elements 40 and the pressure of the water within the shell 38 between the reservoirs 42 and 44 are applied to the heat collecting elements 40 from their outside, whereas the pressure of the heat exchange medium is applied to the heat collecting elements 40 from their inside. The level of the heat exchange medium within the reservoirs 42 and 44 and the level of the water within the shell 38 between the reservoirs 42 and 44 can be adjusted as required.

Figure 8:
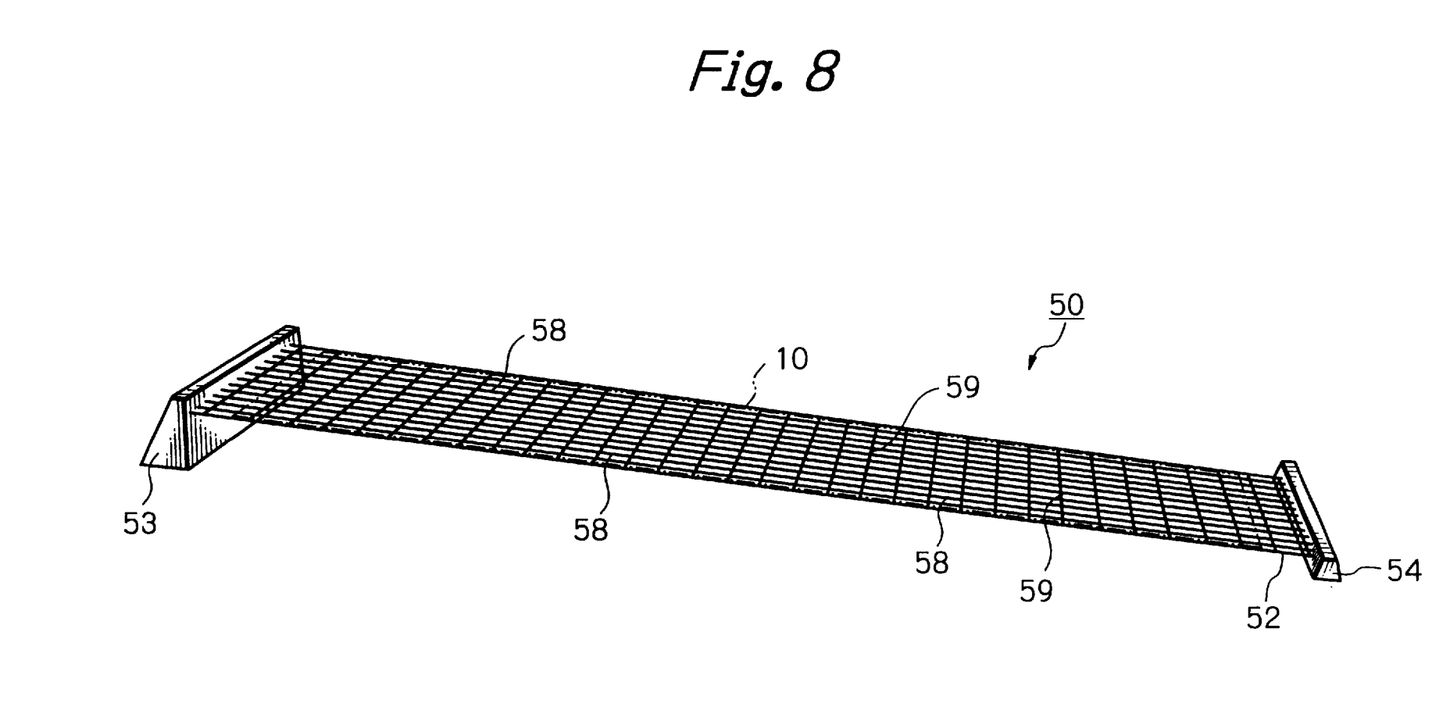
FIG. 8 is a perspective view of a solar power system wherein the flow controllable panel is mounted on a carrier.

FIG. 8 illustrates a solar power system as another application of the present invention. A solar power system 50 includes a carrier 52 composed of two spaced anchors 53 and 54, and a metal net 56 on which the flow controllable panel 10 as a heat exchanger is arranged. The metal net 56 has a plurality of longitudinal wires 58 having opposite ends secured to the anchors 53 and 54, and a plurality of transverse wires 59 extending across the longitudinal wires 58. A suitable amount of tension is applied to the longitudinal wires 58. The anchor 53 has a height greater than that of the other anchor 54 so as to facilitate the flow of a fluid through the flow controllable panel 10. It will be understood that the use of a longer heat exchanger panel brings about an increase in effective heat transfer area.

Conventionally, a water-water type heat pump was used to collect heat from a stream of relatively low temperature river water. However, such a conventional heat pump is rather expensive to manufacture and install and thus, impractical. This problem can be overcome by the use of undulating flow controllable panels according to another embodiment of the present invention.

Figure 9:
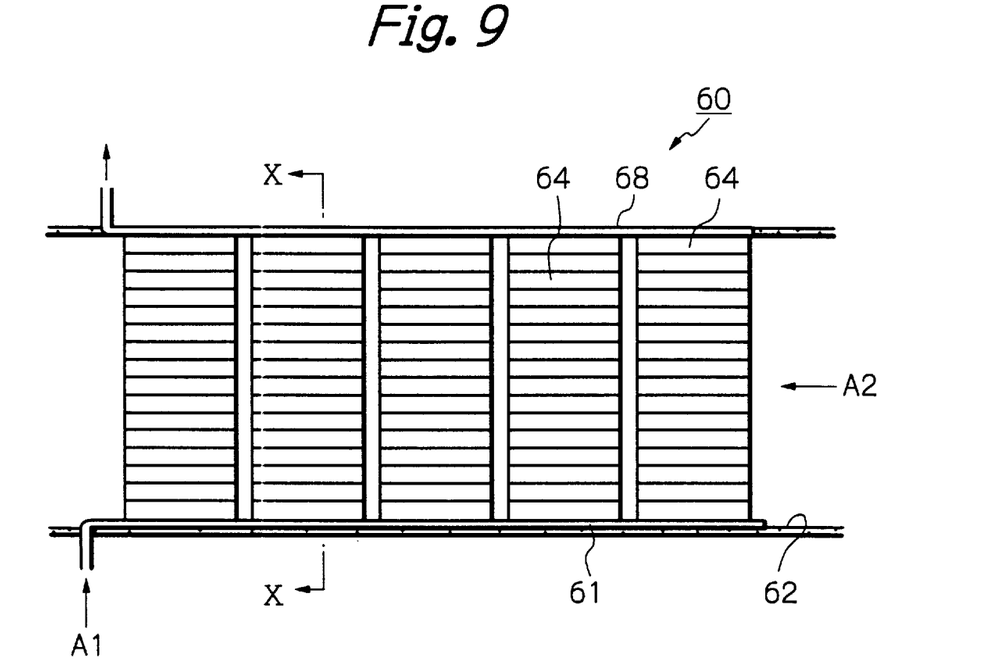
FIG. 9 is a plan view of a cross-flow type heat exchanger installed in a channel.
Figure 10:
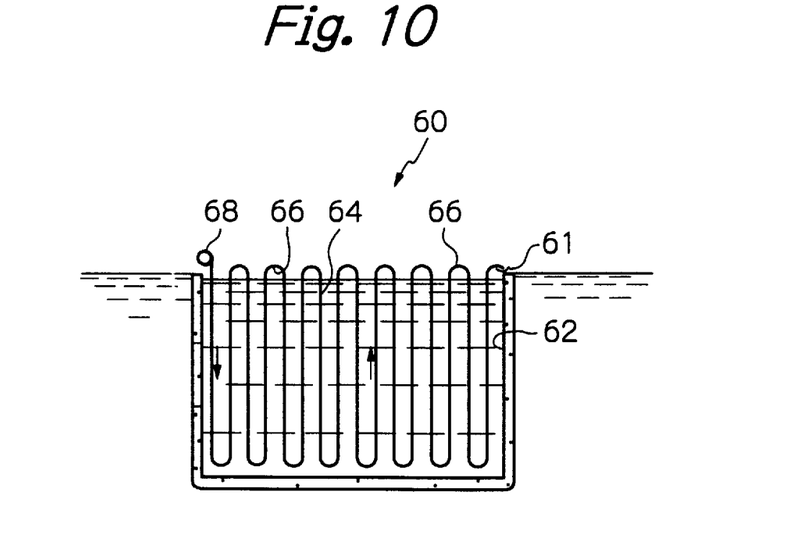
FIG. 10 is a sectional view taken on the line X—X in FIG. 9.

Referring specifically to FIGS. 9 and 10, a large-sized heat exchanger 60 includes a channel 62 and a plurality of undulating flow controllable panels 64 arranged in parallel along the channel 62. The undulating heat exchanger panels 64 are suspended from a common support 66 and immersed in a fluid flowing through the channel 62. The undulating heat exchanger panels 64 are similar in structure to the flow controllable panel 10 shown in FIG. 1 except that the undulating heat exchanger panels 64 extend along an undulating path rather than a straight path as in the flow controllable panel 10. Thus, details of the undulating heat exchanger panels 64 will not be described herein. A supply conduit 61 is connected to the undulating heat exchanger panels 64 to introduce low temperature water from the sea into the heat exchanger panels 64, in the direction of the arrow A1 in FIG. 9, after the sea water has been filtered. Used high temperature sea water is introduced in the direction of the arrow A2 in FIG. 9 and flows along the outer surface of each of the heat exchanger panels 64 to effect heat exchange between the liquids. As a result of this heat exchange, heat is collected by a heat collector means as designated by the reference numeral 68.

In the embodiment shown in FIGS. 9 and 10, a buoyant force is applied to the underwater heat exchanger panels 64. This force reduces the loads of the underwater heat exchangers 64 applied to their support 66. As such, the underwater heat exchanger panel is easier to install than a conventional ground heat exchanger.

It is to be understood that the present invention may be applied to other underground systems such as an underground drain system, an underground feedwater system, an underground water retention system, and an underground water collection system.

Figure 11:
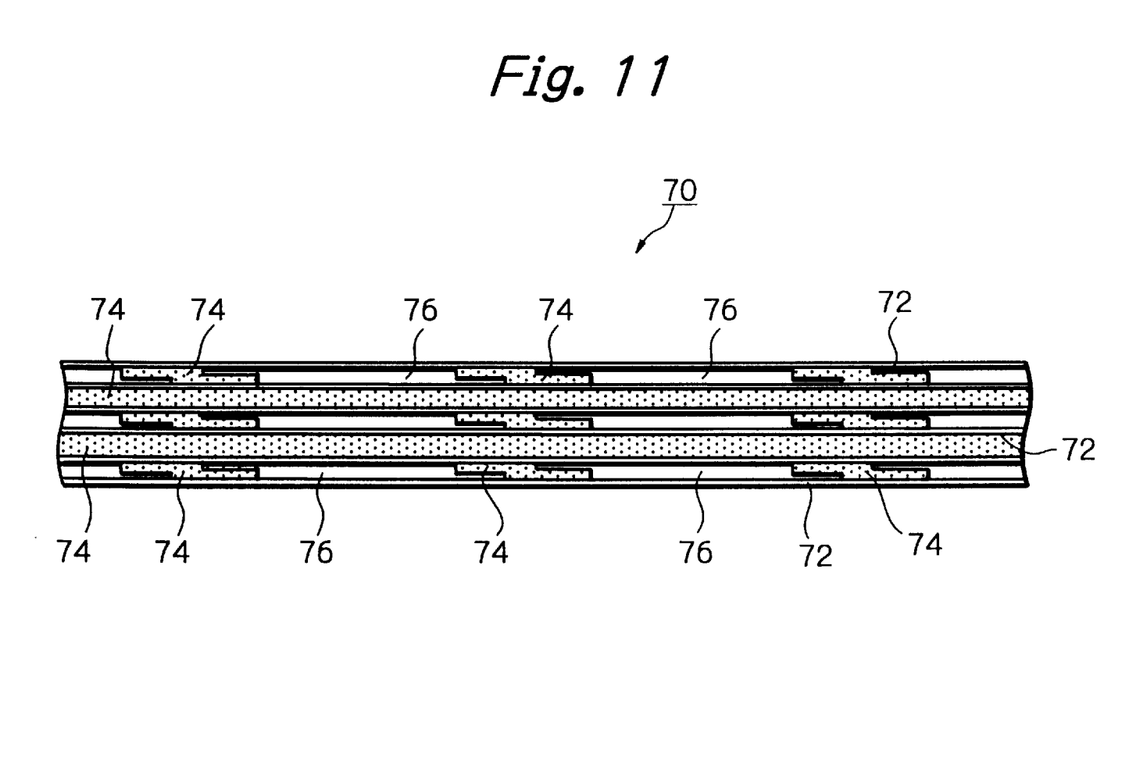
FIG. 11 is a sectional side elevation of a flow controllable panel according to another embodiment of the present invention.

FIG. 11 illustrates a flow controllable panel made according to a further embodiment of the present invention. Specifically, a flow controllable panel 70 includes three pairs of sheets 72 arranged one above the other, and a pair of spacers 74 placed between the sheets 72 to define a plurality of passages 76. The spacers 74 are arranged such that those passages 76 which are formed between the first pair of sheets 72 extend across those spacers 74 which are arranged between the first pair of sheets and the second pair of sheets 72. The sheets 72 and the spacers 74 are substantially identical in structure to those shown in FIG. 1 and will not be described herein. It should, of course, be understood that four or more pairs of sheets may be arranged in a vertical stack.

The flow controllable unit made according to the present invention may be mounted to the roof of a house, for example, to remove or melt snow as a result of heat exchange between the snow and hot water flowing through the flow controllable unit. The flow controllable unit may also be used as a heat collection panel, particularly during summer, to collect heat from the sun, or as a cooling panel to cool the roof or the outer wall of a house. When the flow controllable unit is mounted to the inner wall of the house, it may serve as a heat exchanger to adjust or control the temperature of air in the house. Additionally, the flow controllable unit by itself may be used as building or construction materials. The flow controllable unit may be made in the form of a heat exchanger membrane. Further, the flow controllable panel may be attached to a variety of boards. A plurality of combined flow controllable panels/boards may be interconnected together to form a unit.

Advantageously, cold water can readily be produced if water is introduced into the flow controllable unit when embedded horizontally in the ground. The flow controllable unit may, of course, be embedded in any other orientations. The flow controllable panel, for example, when placed on a snowy road, can effectively melt snow. Moreover, the flow controllable unit, when installed in the base of a house, can be used as a means to collect spring water.

A heating medium such as water vapor, hot wind, cold wind or sea water is introduced into the flow controllable panel to effect heat exchange between such a heating medium and the water while the flow controllable unit is moored, suspended, or immersed in the water.

Also, the flow controllable unit of the present invention may be:

1. installed in a heat exchanger to heat up water in outdoor pools or water to be fed to boilers;
2. installed in a nursery to heat circulating sea water at a low temperature particularly during winter;
3. installed in an airplane or train cleaning station to heat circulating water at a low temperature;
4. installed in an activated sludge tank to heat up a treatment liquid particularly during winter;
5. installed in a market garden to control the temperature of air in a hothouse to produce forced grape, melon and other fruits;
6. used as a heat collector to produce purified water for industrial or agricultural use or for drink;
7. used as a radiator/evaporator to melt snow, to cool the surface of a roof or to cool or vaporize the surface of a membrane;
8. used to cool the wall of a constant-temperature storage or refrigerator to cultivate fungi or to preserve various agricultural products;
9. used in a bacterium cultivating facility to control the temperature of a cultivating liquid for cultivating chlorella or other bacteria;
10. used in a hydroponic bed to heat/cool a hydroponic water;

11. used as an artificial flower cultivating bed or indoor or outdoor suspended cultivating sheet;

12. used as a water carrier, water transfer sheet, flat pipe, or sludge water filter;

13. embedded in the ground to effect heat exchange, to drain water and to reserve water;

14. used as a heat collector such as laminated heat sheet or block;

15. used as an evaporator/concentrator sheet to produce natural salt or to concentrate waste water;

16. used as a sheet-like waterweed bed or water-soluble substrate; and 17. used as a display sheet to decorate flowing water.

The present invention has been described with respect to its preferred embodiments. It will be understood that various modifications and changes may be made without departing from the spirit and scope of the invention as defined by the appended claims. For example, the upper and lower sheets may be made of resin. Alternatively, the sheets may be a combination of a resinous layer and a thin metal layer or a fibrous layer. Still alternatively, the sheets may be replaced by metal plates, ceramic boards or resinous boards.

What is claimed is:

1. A self-adjusting fluid channeling unit for channelling flow of a fluid medium therethrough, said self-adjusting fluid channeling unit comprising:

at least one pair of facing first and second surface elements;

a plurality of elongated partitions placed between said at least one pair of first and second surface elements and arranged substantially in parallel so as to define a plurality of passages through which the flowing fluid medium flows, said plurality of passages having a cross sectional area and being contained within the unit, said plurality of partitions each having an intermediate region extending therealong, and two lateral sides located at opposite sides of said intermediate region, said two lateral sides of said plurality of partitions being secured to said at least one pair of first and second surface elements whereby said intermediate region is dynamically movable relative to said at least one pair of first and second surface elements so as to vary the cross sectional area of said plurality of passages in response to a change in pressure within said plurality of passages; and means to conduct the flowing fluid medium into and from said plurality of passages.

2. A self-adjusting fluid channeling unit according to claim 1, wherein one of said two lateral sides has a first face and a second face opposite to said first face, said first face being secured to said first surface element, and said second face being free to move to and away from said second surface element, and the other lateral side has a third face and a fourth face opposite to said third face, said third face being free to move to and away from said first surface element, and said fourth face being secured to said second surface element.

3. A self-adjusting fluid channeling unit according to claim 1, wherein said plurality of partitions have a sufficient thickness so that said at least one pair of first and second surface elements are held in a spaced relationship.

4. A self-adjusting fluid channeling unit for channelling flow of a fluid medium therethrough, said self-adjusting fluid channeling unit comprising:

at least one pair of facing first and second surface elements;

a plurality of elongated partitions placed between said at least one pair of first and second surface elements and arranged substantially in parallel so as to define a plurality of passages through which the flowing fluid medium flows, said plurality of passages having a cross sectional area and being contained within the unit, said plurality of partitions each having an intermediate region extending there along, and two lateral sides located at opposite sides of said intermediate region, said two lateral sides of said plurality of partitions being secured to said at least one pair of first and second surface elements whereby said intermediate region is dynamically movable relative to said at least one pair of first and second surface elements so as to vary the cross sectional area of said plurality of passages in response to a change in pressure within said plurality of passages; and said plurality of partitions are permeable to fluid.

5. A self-adjusting fluid channeling unit according to claim 1, wherein said at least one pair of first and second surface elements extend along an undulating path.

6. A self-adjusting fluid channeling unit for channeling flow of a fluid medium therethrough, said self-adjusting fluid channeling unit comprising:

a plurality of surface means arranged in a spaced relationship;

a plurality of partition means placed between adjacent surface means and adapted to interconnect said plurality of surface means and thereby define said spaced relationship;

a plurality of sets of passages defined between said adjacent surface means and extending along said plurality of partition means, said plurality of partition means including a plurality of elongated partitions disposed in a spaced arrangement between said plurality of surface means, and each of said plurality of partitions having peripheral portions on opposite faces thereof secured to said plurality of said surface means, respectively, whereby an intermediate portion of said partition is dynamically movable relative to said plurality of surface means when pressure changes occur in the fluid medium flowing through said plurality of passages; and means to conduct the flowing fluid medium into and from said plurality of passages.

7. A self-adjusting fluid channeling unit according to claim 6, wherein said plurality of surface means are arranged such that one said set of passages extends across another said set of adjacent passages.

8. A heat exchanger panel comprising:

at least one pair of first and second sheets;

a plurality of pressure relief means sandwiched between said at least one pair of first and second sheets and adapted to maintain said at least one pair of first and second sheets in a spaced relationship;

a plurality of fluid passages for allowing a heat exchange liquid to flow therethrough, said plurality of fluid passages being defined between adjacent ones of said pressure relief means and between said at least one pair of first and second sheets, said plurality of pressure relief means being deformable to allow said at least one pair of first and second sheets to be moved toward and away from one another, whereby said plurality of fluid passages have a variable effective cross sectional area to accommodate a change in pressure within said plurality of fluid passages; and means to conduct the heat exchange liquid into and from said plurality of fluid passages.

9. A heat exchanger panel according to claim 8, wherein said plurality of pressure relief means include elongated spacers.

10. A heat exchanger panel according to claim 9, wherein said elongated spacers are permeable so that said plurality of fluid passages are communicated with each other.

11. A heat exchanger panel according to claim 8, wherein each of said at least one pair of first and second sheets include a hydrophilic inner layer made of a fibrous material, and an outer layer made of resin and laminated to said inner layer.

12. A heat exchanger panel according to claim 11, wherein said hydrophilic inner layer has an inner side and an outer side, said inner side of said hydrophilic inner layer having a low density, and said outer side of said hydrophilic inner layer having a high density.

13. A self-adjusting fluid channeling unit according to claim 6, wherein said plurality of surface means comprises a plurality of planar members.

14. A self-adjusting fluid channeling unit according to claim 13, wherein said planar members each comprise a hydrophilic inner layer facing said plurality of partition means and an outer layer of a resin material bonded to said inner layer.

15. A self-adjusting fluid channeling unit according to claim 13, wherein said planar members are arranged in pairs with said plurality of partition means disposed therebetween.

16. A self-adjusting fluid channeling unit according to claim 6, wherein said plurality of partition means are fluid permeable.

17. A self-adjusting fluid channeling unit according to claim 13, wherein said plurality of partitions are substantially flat and are arranged substantially parallel to each other.

* * * * *

UNITED STATES PATENT AND TRADEMARK OFFICE
CERTIFICATE OF CORRECTION

PATENT NO. : 5,878,807
DATED : 9 March 1999
INVENTOR(S) : Kei Takahashi

It is certified that error appears in the above-identified patent and that said Letters Patent is hereby corrected as shown below:

On the cover page, under "U.S. PATENT DOCUMENTS" delete "2,457,449 1/1948 Granja.........................126/626";
under "FOREIGN PATENT DOCUMENTS" insert -- 2,457,449 1/1981 France.........................126/626--.

Figure 12:
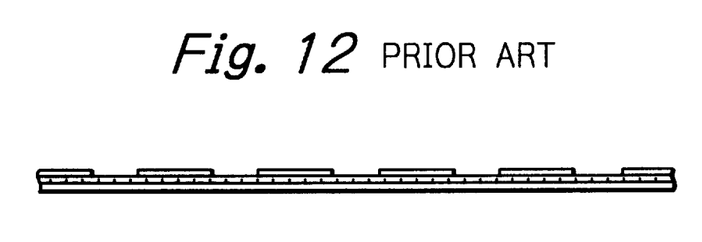
FIG. 12 is a sectional side view of a conventional flow controllable panel.

Column 1, line 18, change "FIG. 12" to --FIG. 12--.

Column 2, line 6, change "there along" to --therealong--;
line 16, before "from" insert --away--.

Column 3, line 44, before "additionally" insert --thus--.

Column 4, line 6, after "This" insert --movement--.

Column 8, 11th line (claim 4, line 14), change "there along" to --therealong--.

Signed and Sealed this

Fourteenth Day of March, 2000

Attest:

Q. TODD DICKINSON

Attesting Officer

Commissioner of Patents and Trademarks